(12) United States Patent
Wilcox et al.

(10) Patent No.: US 9,949,077 B1
(45) Date of Patent: *Apr. 17, 2018

(54) SYSTEMS AND METHODS FOR COMMUNICATING WITH REMOTE USERS

(71) Applicant: BARON SERVICES, INC., Huntsville, AL (US)

(72) Inventors: Sherman Wilcox, Huntsville, AL (US); Robert O. Baron, Sr., Huntsville, AL (US); Jonathan Uhls, Huntsville, AL (US)

(73) Assignee: Baron Services, Inc., Huntsville, AL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/673,777

(22) Filed: Aug. 10, 2017

Related U.S. Application Data

(63) Continuation of application No. 14/847,877, filed on Sep. 8, 2015, now Pat. No. 9,763,040.

(60) Provisional application No. 62/047,409, filed on Sep. 8, 2014.

(51) Int. Cl.
*H04W 4/02* (2009.01)
*H04W 4/14* (2009.01)
*G06F 3/0484* (2013.01)

(52) U.S. Cl.
CPC ........ *H04W 4/021* (2013.01); *G06F 3/04842* (2013.01); *H04W 4/14* (2013.01)

(58) Field of Classification Search
CPC ... G06C 30/02; G06C 50/01; G06F 17/30241; H04N 2201/3253; H04N 1/00164; H04N 1/00411; H04L 61/609; H04L 63/0876; H04M 2250/10; H04W 4/206; H04W 4/021; H04W 88/08
See application file for complete search history.

(56) References Cited

U.S. PATENT DOCUMENTS

| | | | |
|---|---|---|---|
| 6,275,774 B1 | 8/2001 | Baron, Sr. et al. | |
| 6,542,825 B2 | 4/2003 | Jones et al. | |
| 7,847,708 B1 | 12/2010 | Jones et al. | |
| 8,427,308 B1 | 4/2013 | Baron, Sr. et al. | |
| 8,599,013 B1 | 12/2013 | Baron, Sr. | |
| 2002/0016677 A1 | 2/2002 | Baron | |
| 2008/0270163 A1 | 10/2008 | Green | |
| 2012/0264446 A1 | 10/2012 | Xie | |

(Continued)

*Primary Examiner* — Nizar Sivji
(74) *Attorney, Agent, or Firm* — Maynard Cooper & Gale, P.C.; Jon Holland

(57) ABSTRACT

A messaging system comprises memory for storing contact information and location information for a plurality of users, referred to hereafter as "participants," who may be dispersed across a wide geographic area. When a user desires to solicit images from a particular geographic region of interest, the user provides inputs indicative of such region, and messaging logic then automatically determines which participants are within the region of interest based on the stored location information. Using the contact information, the messaging logic then initiates communication with the identified participants in order to solicit images of the region of interest. In response, willing participants may capture and return images as may be desired. Thus, the system facilitates the process of finding people at or close to an event of interest, communicating with such people to solicit images of the event or the effects of the event, and then collecting such images.

19 Claims, 9 Drawing Sheets

(56) References Cited

U.S. PATENT DOCUMENTS

2015/0271393 A1   9/2015  Cudak
2016/0073233 A1   3/2016  Wilcox et al.

SYSTEMS AND METHODS FOR COMMUNICATING WITH REMOTE USERS

CROSS REFERENCE TO RELATED APPLICATIONS

This application is a continuation of and claims priority to U.S. patent application Ser. No. 14/847,877, entitled "Systems and Methods for Communicating with Remote Users" and filed on Sep. 8, 2015, which is incorporated herein by reference. U.S. patent application Ser. No. 14/847,877 claims priority to U.S. Provisional Application No. 62/047,409, entitled "Systems and Methods for Communicating with Remote Users" and filed on Sep. 8, 2014, which is incorporated herein by reference.

RELATED ART

When reporting on or forecasting weather or geological events, such as storms, hurricanes, mudslides, floods, tsunamis, and earthquakes, a weatherman at a television weather station will often reference images showing the effects of such events. As an example, images of an area inundated by flood waters or damage caused by a storm may be displayed within a broadcast from the television weather station. Often these images are captured at the scene of an event by people who email or otherwise send images to the television weather station, sometimes at the request of the weatherman.

With the proliferation of cellular telephones and other mobile devices, more and more users are equipped with devices capable of capturing and sending images of scenes or storm report information that may be of interest to a television weather station. Thus, when a weather or geological event occurs, a television weather station often receives a relatively large number of storm reports and images showing the effects of the event. Further, the effects of many weather and geological events span across a wide geographic area, and for any given event a television weather station may receive images and reports from many different geographic regions.

In many cases, a user at a television weather station desires to find an image showing the effects of a weather or geological event occurring in a specific area, such as an area hit by a tornado or other specific event. Unfortunately, the process of reviewing all of the images received by a weather television station to find an image of particular interest can be burdensome and time consuming. In addition, in some cases, the television weather station may not receive any images of the particular event or area of interest in which case a user may waste time and effort searching for an image that is unavailable.

In order to find an image or information of a specific event or area of interest, a user at a television weather station may initiate communication with certain individuals, such as amateur weather enthusiasts who have a relationship with the television weather station, and request that they attempt to capture and send storm related information or images of interest. However, it can be difficult and time consuming to find an individual who is at or close to the area or event of interest and who is willing and available to capture information and images at the time of occurrence of the event.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to messaging systems and methods for soliciting images from or otherwise communicating with remote users based on their geographic locations. In one exemplary embodiment, a messaging system comprises memory for storing contact information and location information for a plurality of users, referred to hereafter as "participants," who may be dispersed across a wide geographic area. The location information of a participant indicates his or her current geographic location and may be obtained through the use of global positioning system (GPS) technology or other type of technology for determining the location of objects. When a user desires to solicit images or information from a particular geographic region of interest, the user provides inputs indicative of such region, and messaging logic then automatically determines which participants are within the region of interest based on the stored location information. Using the contact information, the messaging logic then initiates communication with the identified participants in order to solicit images or information of the region of interest. In response, willing participants may capture and return images or otherwise send information as may be desired. Thus, the system facilitates the process of finding people at or close to an event of interest, communicating with such people to solicit images of the event or the effects of the event, and then collecting such images and information.

Figure 1:
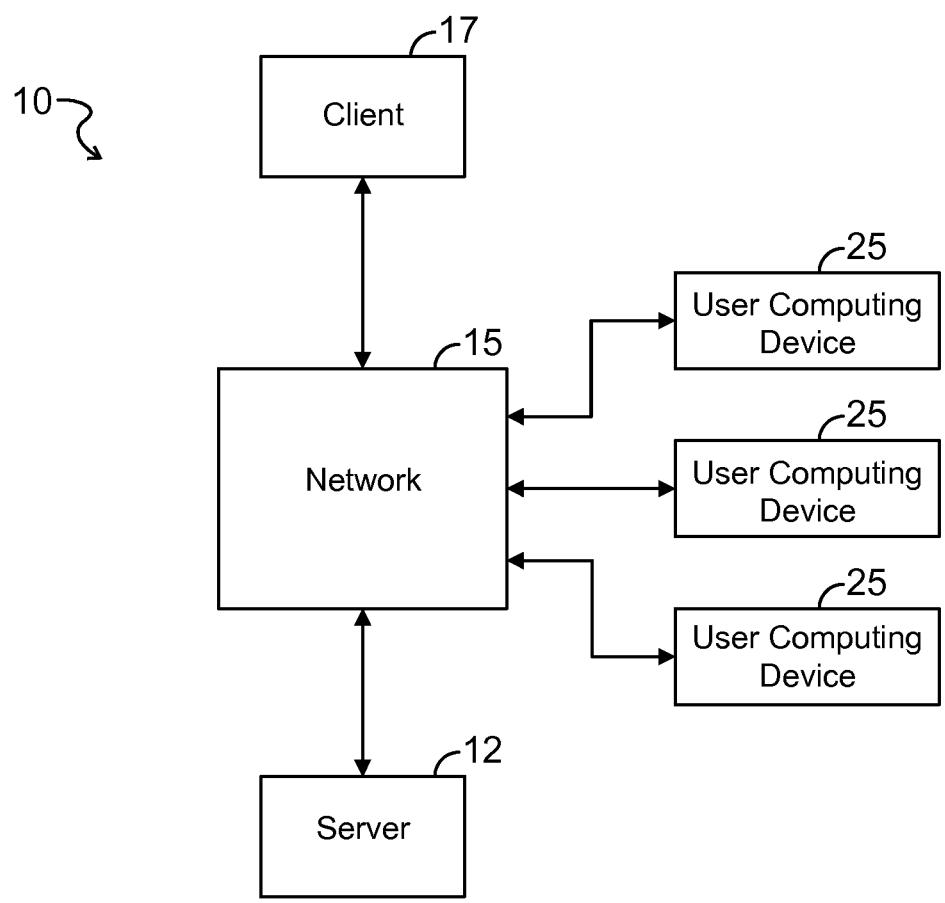
FIG. 1 is a block diagram illustrating an exemplary embodiment of a messaging system for solicitation of images.

FIG. 1 depicts an exemplary embodiment of a system 10 for soliciting images from remote users. The system 10 comprises a server 12 that is communicatively coupled to a network 15 for communicating with a client 17 that may be at a remote location relative to the server 12. In one exemplary embodiment, the client 17 is implemented and used by users at a television weather station, but the client 17 may be implemented at other locations and used by other types of users in other embodiments.

The network 15 may comprise a local area network (LAN), a wide area network (WAN), or any other type of communication network. In one exemplary embodiment, the network 15 comprises the Internet, and messages are communicated across the network 15 using transmission control protocol/Internet protocol (TCP/IP), but other types of networks and other types of protocols are possible in other embodiments.

As shown by FIG. 1, the system 10 also comprises a plurality of user computing devices 25 that are used by users, referred to herein as "participants." Each user computing device 25 can be any device capable of interacting with a participant and communicating with the server 12 or other devices using the network 15 or otherwise. As an example, a user computing device 25 may be implemented as a desktop or laptop computer. A user computing device 25 may also be implemented as a mobile communication device, such as a cellular telephone.

In general, the client 17 is configured to receive a user input indicating a geographic region of interest to a user. Information indicative of such geographic region is communicated to the server 12, which then determines which of the user computing devices 25 are within the identified region. The server 12 then communicates with such user computing devices 25 to solicit at least one image from the identified region. In response, the participants of these computing devices 25 may then capture and send one or more images from the identified region. Exemplary techniques for soliciting and processing images of interest will be described in more detail below.

Figure 2:
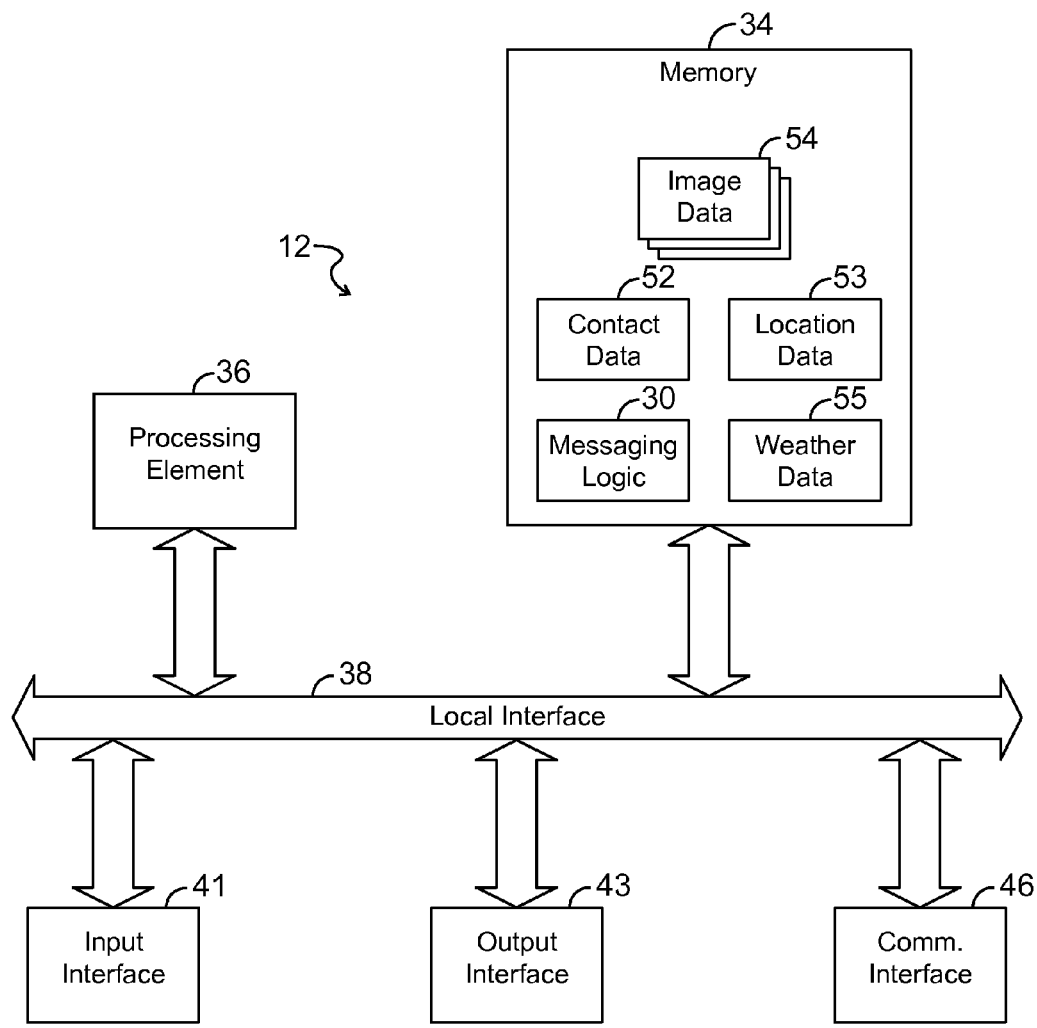
FIG. 2 is a block diagram illustrating an exemplary embodiment of a server, such as is depicted by FIG. 1.

FIG. 2 depicts an exemplary embodiment of the server 12. As shown by FIG. 2, the server 12 comprises logic 30, referred to hereafter for simplicity of illustration as "messaging logic," for generally controlling the operation of the server 12 and solicitation events, as will be described in more detail hereafter. The messaging logic 30 can be implemented in software, hardware, firmware or any combination thereof. In the exemplary server 12 illustrated by FIG. 2, the messaging logic 30 is implemented in software and stored in memory 34 of the server 12.

Note that the messaging logic 30, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary server 12 depicted by FIG. 2 comprises at least one conventional processing element 36, such as a digital signal processor (DSP) or a central processing unit (CPU), that is configured to execute instructions from software or firmware stored in memory 34. The processing element 36 communicates to and drives the other elements within the server 12 via a local interface 38, which can include at least one bus. Furthermore, an input interface 41, for example, a keyboard, keypad, or a mouse, can be used to input data from a user of the server 12, and an output interface 43, for example, a printer, monitor, liquid crystal display (LCD), or other display apparatus, can be used to output data to the user. In some cases, the same device, such as a touchscreen, for example, may be configured to input and output data and, thus, used to implement both the input interface 41 and the output interface 43.

Further, the server 12 also comprises a communication interface 46, such as at least one modem, that may be used to communicate data with the network 15 (FIG. 1). Note that the communication interface 46 may be coupled to the network 15 via a physical medium, such as a conductive or optical connection. Alternatively, the communication interface 46 may be configured to communicate with the network 15 wirelessly.

As shown by FIG. 2, the server 12 is configured to store contact data 52, which identifies each participant registered with the server 12. For each such participant, the contact data 52 includes an identifier, referred to hereafter as "participant identifier," and contact information for enabling the server 12 to communicate with the user computing device 25 (FIG. 1) for that participant. As an example, if the user computing device 25 is a cellular telephone, the contact information may include a telephone number that may be used to place a call with or send a message (e.g., an email message, a text message, or a push notification) to the telephone. In one exemplary embodiment, the contact information is a unique phone identifier that can be used to send push notifications to the user computing device 25.

The server 12 also stores location data 53, which indicates the current location of each registered participant. In one exemplary embodiment, the location information is obtained through GPS technology, and the location data 53 indicates the geographic coordinates of each participant. However, in other embodiments, other types of location information may be indicated by the location data 53.

As shown by FIG. 2, the server 12 also stores sets (e.g., files) of image data 54 that are collected from the user computing devices 25, as will be described in more detail hereafter. Each set of image data 54 defines at least one image of a scene captured by a camera.

In addition, the server 12 stores weather data 55 indicative of past, current, or future weather conditions across a wide geographic region, including areas in which one or more of the user computing devices 25 are located. As an example, the weather data 55 may include radar or satellite data, as well as other types of data typically used by weather forecasters to assess weather conditions and provide weather forecasts. The weather data 55 may be obtained directly from weather radar systems or satellites and also from various agencies, such as the National Weather Service, that collect weather-related data from various sources. As an example, at least a portion of the weather data 55 may be communicated to the server 12 via the network 15.

The weather data 55 may also include notifications from the National Weather Service or other sources identifying a particular geographic region for a weather or geological event. As an example, the weather data 55 may indicate a watch or warning, such as a thunderstorm, tornado, hurricane, or tsunami warning, issued by the National Weather Service or other source. Such notification may include data identifying the geographic region to which the watch or warning pertains.

Figure 3:
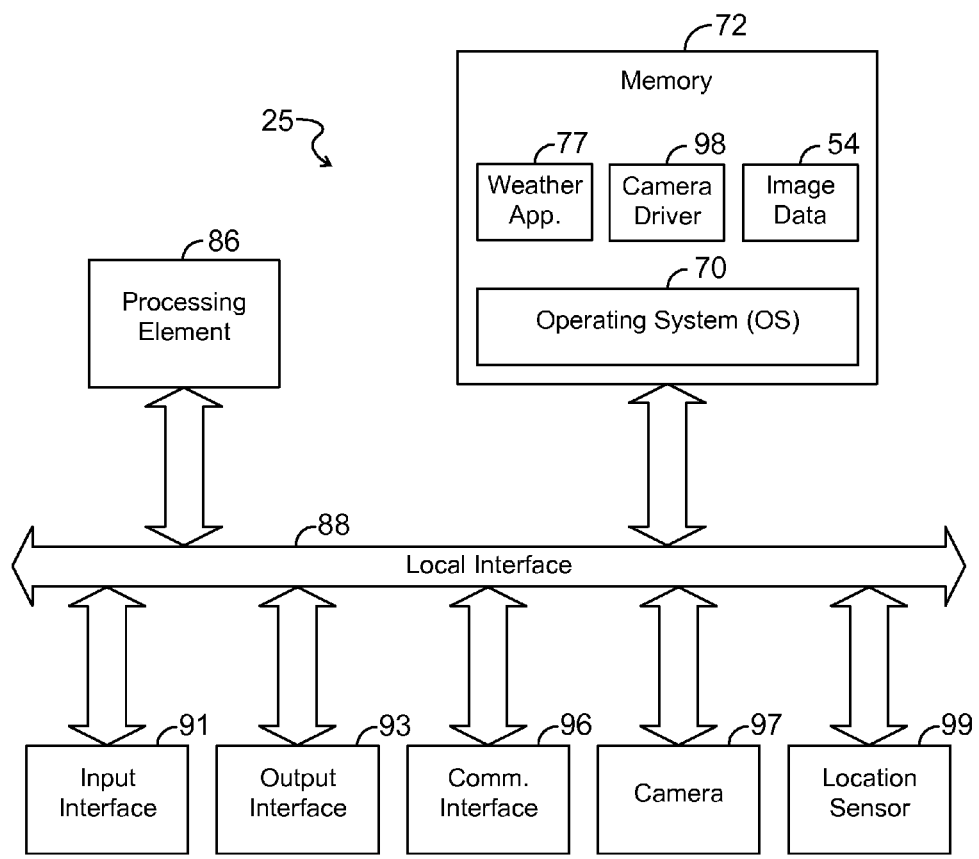
FIG. 3 is a block diagram illustrating an exemplary embodiment of a user computing device, such as is depicted by FIG. 1.

FIG. 3 depicts an exemplary embodiment of a user computing device 25. As shown by FIG. 3, the user computing device 25 comprises a conventional operating system (OS) 70 that generally manages the resources of the device 25. In the exemplary embodiment depicted by FIG. 3, the OS 70 is implemented in software or firmware and stored in memory 72. In other embodiments, portions of the OS 70 may be implemented in hardware, if desired. Also stored in memory 72 is a weather application 77 that is configured to communicate with the server 12 for rendering the weather data 55 to the user of the device 25, as well as performing other functions as will be described in more detail hereafter. In the embodiment shown by FIG. 3, the weather application 77 is implemented in software, but at least portions of the application 77 can be implemented in hardware or firmware. When implemented in software, the weather application 77 can be stored and transported on any computer-readable medium for use by or in connection with an instruction execution apparatus that can fetch and execute instructions.

The exemplary device 25 depicted by FIG. 3 comprises at least one conventional processing element 86, such as a digital signal processor (DSP) or a central processing unit (CPU), that is configured to execute instructions from software or firmware stored in memory 72. The processing element 86 communicates to and drives the other elements within the device 25 via a local interface 88, which can include at least one bus. Furthermore, an input interface 91, for example, a keyboard, keypad, or a mouse, can be used to input data from a user of the device 25, and an output interface 93, for example, a printer, monitor, liquid crystal display (LCD), or other display apparatus, can be used to output data to the user. In some cases, the same device, such as a touchscreen, for example, may be configured to input and output data and, thus, used to implement both the input interface 91 and the output interface 93.

Further, the device 25 also comprises a communication interface 96, such as at least one modem, that may be used to communicate data with the network 15 (FIG. 1). Note that the communication interface 96 may be coupled to the network 15 via a physical medium, such as a conductive or optical connection. Alternatively, the communication interface 96 may be configured to communicate with the network 15 wirelessly. As an example, in one exemplary embodiment, the communication interface 96 comprises a cellular transceiver, and the network 15 comprises a cellular network that interfaces the device 25 with the Internet for communication with the server 12. In other embodiments, other types of devices, networks, and techniques may be used for the communication between the server 12 and the user computing device 25.

In one exemplary embodiment, the device 25 comprises a camera 97 that is configured to capture digital images (e.g., pictures or video) of a scene. The camera 97 operates under the control of a camera driver 98. In the exemplary embodiment shown by FIG. 3, the camera driver 98 is implemented in software or firmware stored in memory 72, but at least portions of the camera driver 98 may be implemented in hardware, if desired.

The user computing device 25 also comprises a location sensor 99 that is configured to determine a location of the device 25. In one exemplary embodiment, the location sensor 99 comprises a GPS receiver that is configured to receive wireless signals from satellites and to use triangulation or other types of techniques to determine the location of the device 25 based on the wireless signals. In other embodiments, other types of location sensors are possible.

From time-to-time, the weather application 77 is configured to transmit data indicative of the current location of the device 25, as indicated by the location sensor 99, to the server 12. As an example, this location data may be transmitted periodically or after the weather application 77 has determined that the device 25 has moved more than a threshold distance from its last location reported to the server 12. When the server 12 receives such a location update from a user computing device 25, the messaging logic 30 is configured to update the location data 53 so that the participant's current location is indicated by the data 53.

Note that it is unnecessary for a user computing device 25 to have a location sensor 99. Some devices (e.g., a desktop computer) move infrequently, and it is unnecessary to track the location of such devices in real time. The location of a stationary device 25 can be provisioned into the location data 53 without updating such location over time.

Figure 4:
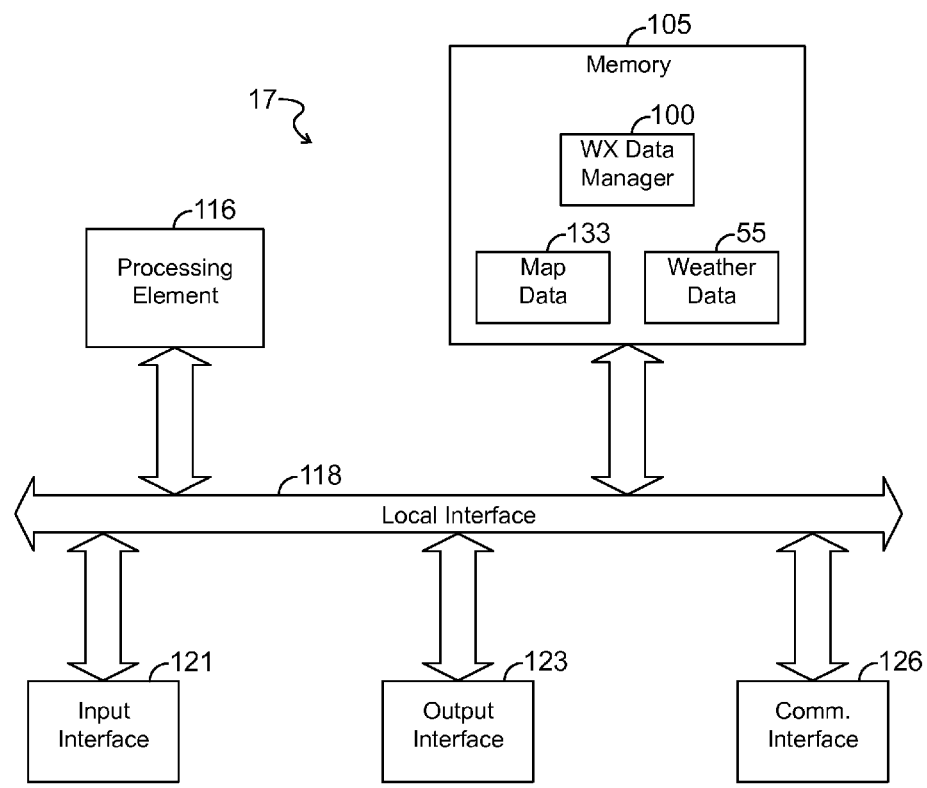
FIG. 4 is a block diagram illustrating an exemplary embodiment of a client, such as is depicted by FIG. 1.

FIG. 4 depicts an exemplary embodiment of the client 17. As shown by FIG. 4, the client 17 comprises a weather (WX) data manager 100 that is configured to download weather data 55 from the server 12 and to render the weather data 55, as will be described in more detail hereafter. In other embodiments, other types of data managers may be used. In the exemplary embodiment shown by FIG. 4, the WX data manager 100 is implemented in software and stored in memory 105. In other embodiments, the WX data manager 100 may be implemented in software, firmware, hardware, or any combination thereof. When implemented in software, the WX data manager 100 can be stored and transported on any computer-readable medium for use by or in connection with an instruction execution apparatus that can fetch and execute instructions.

The exemplary client 17 depicted by FIG. 4 comprises at least one conventional processing element 116, such as a digital signal processor (DSP) or a central processing unit (CPU), that is configured to execute instructions from software or firmware stored in memory 105. The processing element 116 communicates to and drives the other elements within the client 17 via a local interface 118, which can include at least one bus. Furthermore, an input interface 121, for example, a keyboard, keypad, or a mouse, can be used to input data from a user of the client 17, and an output interface 123, for example, a printer, monitor, liquid crystal display (LCD), or other display apparatus, can be used to output data to the user. In some cases, the same device, such as a touchscreen, for example, may be configured to input and output data and, thus, used to implement both the input interface 121 and the output interface 123.

Further, the client 17 also comprises a communication interface 126, such as at least one modem, that may be used to communicate data with the network 15 (FIG. 1). Note that the communication interface 126 may be coupled to the network 15 via a physical medium, such as a conductive or optical connection. Alternatively, the communication interface 126 may be configured to communicate with the network 15 wirelessly.

As shown by FIG. 4, map data 133 is stored in memory 105 and used by the WX data manager 100 to define maps for use in forecasting or reporting weather based on the weather data 55. In this regard, the WX data manager 100 receives inputs from a user via the input interface 121 indicating a desired map format and region of interest. The WX data manager 100 then generates a display of a map of the identified region using the map data 133 and overlays portions of the weather data 55 onto the map depending on the indicated format. As an example, the WX data manager 100 may be used by a user at a television weather station to define a desired map (e.g., weather radar map, flood inundation map, etc.) for use by a weatherman in forecasting or reporting weather conditions during a television broadcast.

In such example, the operators of the television weather station may solicit users to become participants in services offered by the station so that the participants can easily interact with a website of the station and receive weather-related news and alerts from the station. Such participants download the weather application 77 to their user computing devices 25 in order to facilitate interactions between the participants and the television weather station. As an example, when invoked by a participant, the weather application 77 may be configured to navigate to a website of the television weather station. Further, the WX data manager 100 may be used by a user of the client 17 in order to define or manage the content of the website, including the display of weather data 55 on the website. That is, the WX data manager 100 is configured to define the format and layout of a graphical user interface (GUI) through which weather data 55 and other information is rendered.

In addition, the server 12 may be configured to facilitate management of the services offered through the WX data manager 100. As an example, through the website of the television station or otherwise, participants may subscribe to a service whereby the participants receive weather-related alerts, such as watches and warnings issued by the National Weather Service. The WX data manager 100 may interact with the server 12 in order to store at the server 12 in the contact data 52 a list of participants subscribing to this service, and the current location of such participants may be indicated by the location data 53.

When an alert is desired (e.g., when a weather-related warning is issued), the messaging logic 30 is configured to consult the location data 53 to determine which participants are currently within the region to which the alert pertains. In this regard, as described above, the alert typically includes location information indicative of the geographic region associated with the notice, and the messaging logic 30 compares this location information with the location data 53 in order to identify which participants are within such geographic region and, thus, should receive an alert. The messaging logic 30 then consults the contact data 52 to determine the contact information (e.g., telephone numbers or email addresses) to be used for sending the alert to the identified participants. Thus, based on the contact data 52 and the location data 53, the messaging logic 30 is configured to send a message indicative of the alert to each participant within the region that is associated with the alert. As an example, if a tornado warning is issued by the National Weather Service, a message indicative of the tornado warning may be sent to each participant within the area to which the warning pertains.

Note that the messages communicated between the server 12 and the user computing devices 25 include various overhead that facilitates management of the services offered through the server 12. As an example, a message transmitted from a user computing device 25 preferably includes a participant identifier, location data, a client identifier, and a timestamp. The participant identifier identifies the participant who is associated with the device 25 relative to the other participants registered with the server 12. The location data indicates the current location of the device 25 as determined by the device's location sensor 99. Based on the participant identifier and location data in the message, the messaging logic 30 may update the location data 53 at the server 12 to indicate the participant's current location. The client identifier uniquely identifies the client 17 relative to other clients (not shown) that may be serviced by the server 12. In this regard, the server 12 may maintain a separate set of contact data 52 and location data 53 for each client that is serviced by the server 12. Using the client identifier in a received message, the messaging logic 30 can determine which client 17 is associated with the message and, hence, which set of contact data 52 and location data 53 is applicable to the message.

Note that the client identifier may be used to restrict access to the data 52 and 53. In this regard, each set of contact data 52 and location data 53 that is maintained for the client 17 is associated with the client identifier of that client, and messages transmitted to the server 12 from the client 17 have overhead that includes such client identifier. Once a user of the client 17 provides appropriate credentials (e.g., username and/or password), the client 17 is permitted to access and, if desired, modify the contact data 52 and the location data 53 that are associated with the client identifier.

In one exemplary embodiment, the infrastructure that exists to provide the services described above, such as the alert notifications that are pushed to the user computing devices 25 based on location, is leveraged to facilitate solicitation of images from regions of interest, as will be described in more detail below.

In this regard, assume that a user of the client 17 would like to solicit participants to submit images of a particular geographic region, such as a region where a particular weather or geological event is occurring, is about to occur, or has recently occurred. As an example, the user may desire to receive at least one image of an area that has recently been damaged by a storm, such as a tornado, or the user may desire to receive at least one image of an area that is currently flooded. In such cases, the user provides an input via input interface 121 requesting the system 10 to perform an event, referred to hereafter as the "solicitation event," whereby the system 10 solicits participants to take and return pictures or video of the region of interest. As part of such input, the user preferably indicates the boundaries of the region of interest.

Note that there are various techniques that can be used to submit such input. As an example, the WX data manager 100 may be configured to display a text box through which the user enters data by typing. In one exemplary embodiment, the WX data manager 100 displays via the output interface 123 a map defined by the map data 133, and the user selects the geographic region of interest from the map.

Figure 5:
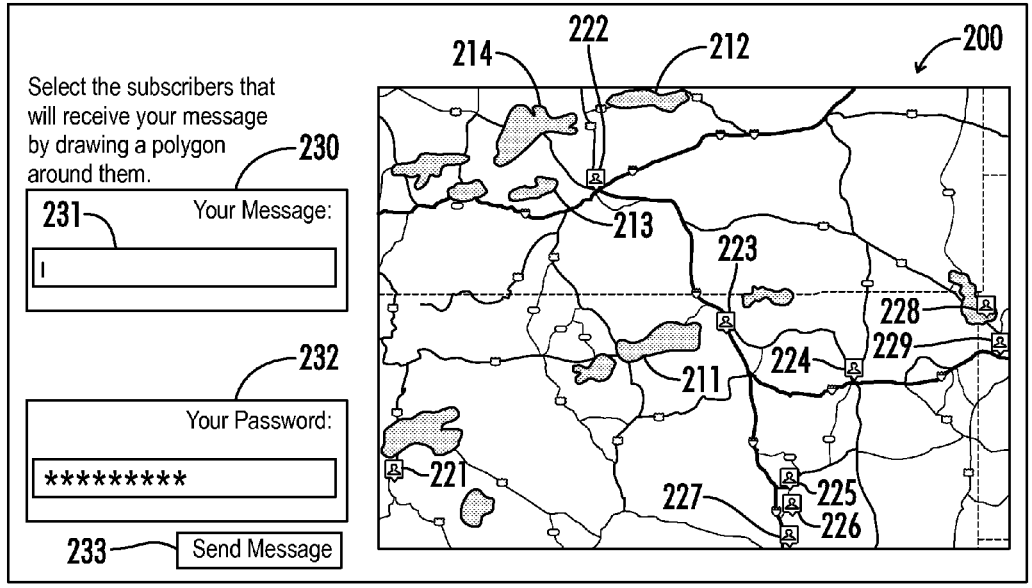
FIG. 5 depicts an exemplary map that may be displayed by a messaging system, such as is depicted by FIG. 1.

As an example, FIG. 5 depicts an exemplary map 200 that may be displayed by the client 17. Such map 200 represents a given geographic region, and the user may provide inputs for controlling the region that is represented by the map 200. As an example, the user may provide inputs for zooming or panning the map 200 in order to change the geographic region represented by the map 200 as is known in the art.

As shown by FIG. 5, weather data 55 may be rendered on the map 200. In this regard, the exemplary map 200 of FIG. 5 is a radar map showing locations of precipitation that are marked by color-coded objects 211-214, referred to hereafter as "weather objects," overlaying the regions of precipitation. The color of a weather object 211-214 is indicative of an amount of precipitation detected for the region over which the object appears, as is known in the art for conventional radar maps. In other examples, other types of maps may be used, and it is unnecessary for the map 200 to be rendered with weather data 55. Further, in other types of maps, the weather objects displayed on the map may represent different types of weather events.

Also displayed on the map 200 is a plurality of graphical objects 221-229, referred to herein as "participant icons," indicating the locations of participants on the map 200. In this regard, each participant icon 221-229 represents the current location of a respective participant who has registered with the sever 12 for the client 17 that is displaying the map 200.

In particular, in rendering the map 200, the WX data manager 100 is configured to retrieve from the server 12 the location data 53 that, as described above, indicates the current geographic location for each participant. For each such participant, the WX data manager 100 displays a participant icon at the location on the map 200 corresponding to the participant's actual location, as indicated by the location data 53. Thus, by viewing the map 200, a user can determine the respective locations of participants that are in the region represented by the map 200. In addition, by comparing the locations of participant icons 221-229 to the locations of the weather objects 211-214 on the map 200, the user can determine the approximate location of each participant relative to the weather events represented by the objects 211-214.

Figure 6:
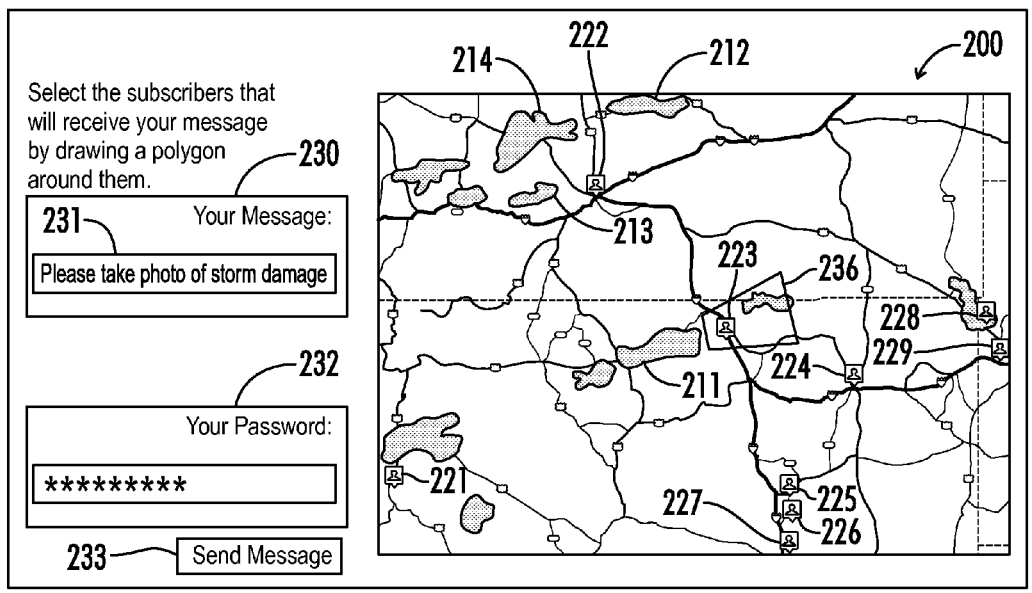
FIG. 6 depicts the map of FIG. 5 after a user has selected a region of interest on the map.

In one exemplary embodiment, the user of the client 17 selects a region of interest using the input interface 121. As an example, FIG. 6 shows the map 200 after a region on the map 200 has been selected by the user. In FIG. 6, such region is represented by a graphical object 236 (e.g., a shaded icon) that is displayed over the selected region in order to graphically indicate the user's selection. Note that there are various techniques that can be used to select the foregoing region.

As an example, the input interface 121 may comprise a mouse, and the user may click the mouse while a cursor controlled by the mouse is at a corner of the region of interest. While holding down the click button on the mouse, the user may move the mouse in order to drag the cursor to an opposite corner (on a diagonal) of the region and then release the click button. Such an operation is commonly referred to as "clicking and dragging" the mouse. Alternatively, the user may use a mouse to click the points along the perimeter of the region to be selected. As an example, the user may click the mouse when the cursor is at each corner of the boundary such that on the fourth corner click a quadrilateral box is defined. In other examples, other shapes defined by other numbers of clicks are possible. In another example, using the mouse a user may draw the boundary of the selected region by moving the cursor along the path of the boundary. In such example, the user may first select a draw operation to indicate a desire to define the boundary so that cursor movements are interpreted as a boundary path for the selected region. When a touchscreen is employed, a user may touch one corner of the region with his finger or an object (e.g., stylus), and drag his finger or object across the screen to the opposite corner (on a diagonal) and then lift his finger or object off the screen. In yet another exemplary embodiment using a touchscreen, a user may move his finger or an object along the boundary in order to draw the boundary similar to the embodiment described above in which a mouse is used to draw a boundary. In other embodiments, various other techniques for selecting the region of interest are possible.

In FIG. 6, there is a single participant icon 223 within the boundary of the object 236 indicating that a single participant is physically in the geographic region of interest. In other examples, any number of participant icons 221-229 may be in the selected region depending on the region selected by the user and the physical locations of the participants.

Note that there may be a variety of reasons that a user would be interested in the region indicated by object 236. As an example, the object 236 may represent a region at which a certain event, such as flooding or storm damage, has occurred, and the user may desire to receive images from such region. Alternatively, the region may be within the path of an approaching storm represented by the object 211, and the user may desire to receive images at the location of the participant associated with icon 223 as the storm is occurring at or near such location. In other examples, yet other reasons for selecting the region represented by object 236 are possible.

In initiating a solicitation event, the user of the client 17 may provide inputs indicating that a textual message is to be communicated to participants for the solicitation event. As an example, the textual message may define a request for which the participant is requested to capture an image of the scenery at his or her location. For example, if the weather event of interest is a tornado, the message may specifically request that the participant capture an image of damage caused by the tornado. After defining the message, the user of the client 17 may submit an input indicating that the solicitation event is to be performed by the system 10.

There are various techniques and interfaces that may be used to permit a user to define a textual message to be sent to participants during a solicitation event or otherwise. FIGS. 5 and 6 depict various graphical objects for assisting the user to define and send a message. In this regard, a graphical object 230, implemented as a text box in FIGS. 5 and 6, is displayed along with the map 200. To enter the text for the message, the user selects the object 230 and types or otherwise inputs characters defining the message. As an example, FIG. 6 shows the object 230 after the message "Test—Rainshower approaching" has been entered by a user. As shown by FIG. 6, the characters input by the user appear in a field 231 of the object 230.

Next to the object 230 is another graphical object 232, also implemented as a text box in FIGS. 5 and 6, for permitting the user to input a password that can be used to authenticate the user. Similar techniques may be used to input data into the object 232.

Next to the object 232 is yet another graphical object 233 implemented as a selectable button in FIGS. 5 and 6. Once the user has selected the region of interest, as indicated by object 236 in FIG. 6, and then defined a message using the object 230, the user may select the object 233 in order to initiate a solicitation event. Note that types of objects 230-233 other than those described above may be used to input data in other embodiments.

In response to selection of the object 233, the WX data manager 100 transmits a command, referred to hereafter as "solicitation command," for instructing the server 12 to perform the solicitation event. In one exemplary embodiment, the command includes data indicative of the textual message defined by the user of the client 17 and the participant identifier associated with each participant icon that is within the selected region of interest. In another exemplary embodiment, the command does not include participant identifiers but rather sends location information indicating the geographic boundary of the selected region of interest (i.e., the region represented by object 236). In such embodiment, the messaging logic 30 is configured to compare such information to the location identifier in order to determine which participants are within the selected region of interest. As indicated above, in the instant example, there is a single participant icon 223 within the selected region, but in other examples there can be any number of participant icons within the selected region.

In response to the solicitation command, the messaging logic 30 is configured to transmit a notification to the user computing device 25 of each participant identified by the solicitation command or otherwise determined to be within the selected region of interest. Such notification preferably includes the data defining the textual message, which is displayed to the participant, as will be described in more detail below.

In this regard, for each participant identified by the solicitation command or otherwise determined to be within the selected region of interest, the messaging logic 30 is configured to retrieve contact information (e.g., cellular telephone number or email address) for the participant. Using such contact information, the messaging logic 30 is configured to transmit a message to the user computing device 25 of the participant. As an example, the messaging logic 30 may transmit a text message, email message, or a push notification via the network 15 or otherwise to the user computing device 25. Note that the contact information preferably indicates the type of message that is to be transmitted for the particular user computing device 25 that is to receive the message. Also note that the message includes overhead indicative of the solicitation event. As an example, the message may include a client identifier identifying the client 17 that initiated the solicitation event.

In one exemplary embodiment, the message transmitted by the messaging logic 30 is of a format that causes the operating system 70 to call the weather application 77 in order to handle the message. As an example, for a user computing device 25 that is implemented as an iPhone® cellular telephone, the message may be implemented as an Apple Push Notification (APN). For a user computing device 25 that is implemented as an Android® cellular telephone, the message may be implemented with Google Cloud Messaging (GCM). In one exemplary embodiment, when the message is received by user computing device 25, the operating system 70 causes a graphical banner to be displayed via the output interface 93 prompting the participant to provide an input indicating whether he or she wishes to view the message. If the participant provides such an input, the operating system 70 calls the weather application 77, which renders the message via the output interface 93.

Figure 7:
FIG. 7 depicts an exemplary graphical user interface (GUI) that may be rendered by a user computing device, such as is depicted by FIG. 1, for enabling a user to capture an image.

In rendering the message, the textual message defined by the user of the client 17 for the solicitation event may be displayed to the participant within a graphical user interface (GUI) of the weather application 100. As indicated above, such textual message may request that the user capture an image of a scene at the participant's approximate location. FIG. 7 depicts an exemplary GUI 252 in which the exemplary textual message described above is displayed within a region 253. As shown by FIG. 7, the GUI 252 includes a graphical object 255 that can be selected by the participant to indicate a desire to comply with the request indicated by the textual message or, in other words, to capture at least one image of a scene to be returned to the client 17.

Figure 8:
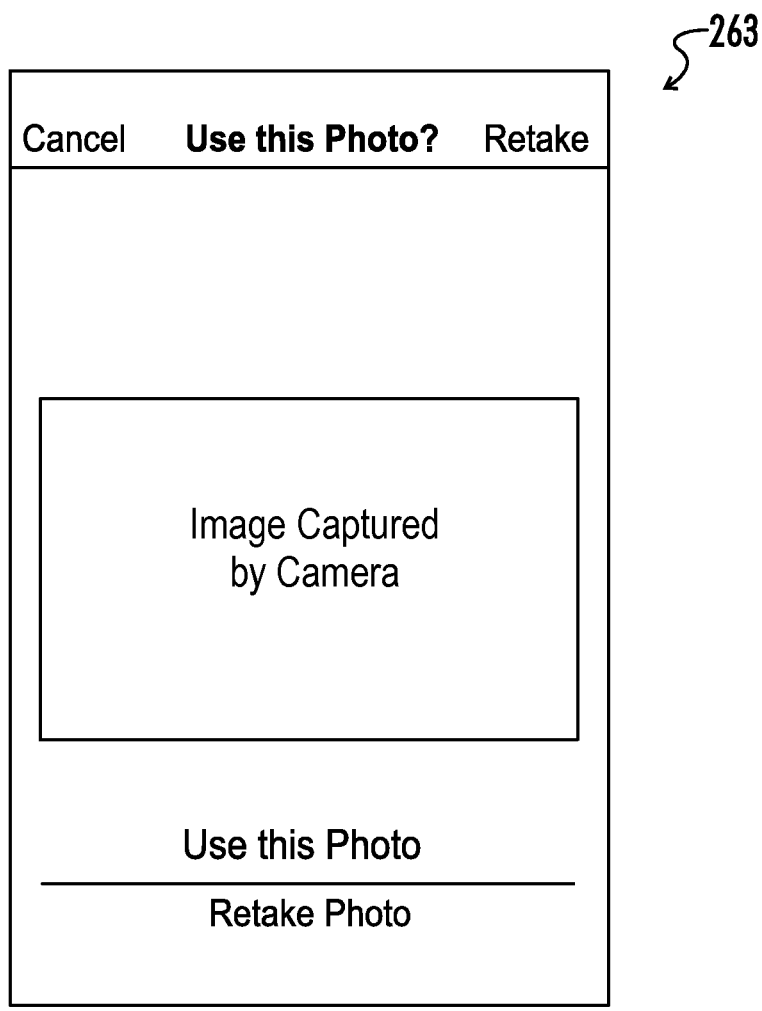
FIG. 8 depicts GUI that may be rendered by a user computing device, such as is depicted by FIG. 1, after a user has captured an image.

In response to selection of the object 255, the weather application 77 communicates with the operating system 70 for calling the camera driver 98, which controls the camera 97 in order to capture at least one image. In this regard, the weather application 77 presents a GUI to the user for permitting the user to view a feed from the camera 97 and for receiving inputs for capturing at least one image. When an image is captured, a set (e.g., file) of image data 54 defining the captured image is stored in memory 72, and the weather application 77 displays the captured image in a GUI 263. FIG. 8 shows an exemplary GUI 263 that is displaying an image captured by the camera 97. Note that the set of image data 54 defining the captured image is associated with metadata indicating the location of the user computing device 25 at the time of capture and a timestamp indicating the time of capture.

As shown by FIG. 8, the GUI 263 presents the participant with various options such as whether to use the captured image for the solicitation event and/or whether to take another photograph for the solicitation event. If the user selects an option to use the captured image, the weather application 77 is configured to transmit to the server 12 a message that includes the image data 54. In transmitting this message 77, the weather application 77 is configured to include metadata, such as the time and location of image capture, the participant identifier, and the client identifier received from the server 12 for the solicitation event.

Upon receiving the foregoing message, the messaging logic 30 is configured to store the image data 54 in memory 105 and to associate the image data 54 with the message's metadata. In particular, the messaging logic 30 associates the image data 54 with the client identifier of the client 17 that initiated the solicitation event so that the image data 54 is accessible to the WX data manager 100 of such client 17. Note that there may be several sets of image data 54 from multiple user computing devices 25 associated with this same client identifier, such as when there are multiple participants within the geographic region of interest. The image data 54 returned to the server 12 for the solicitation event may be automatically transmitted to the client 17, which is configured to render such image data 54 to the user of the client 17, or such user may provide inputs for accessing the image data 54 as may be desired.

In one exemplary embodiment, the user of the client 17 provides inputs for selecting at least one of the sets of image data 54 for rendering the selected set of image data 54 in a display that is generated by the WX data manager 100 and is to be broadcast from the television weather station. In other embodiments, the image data 54 may be selected or used for other purposes.

Figure 9:
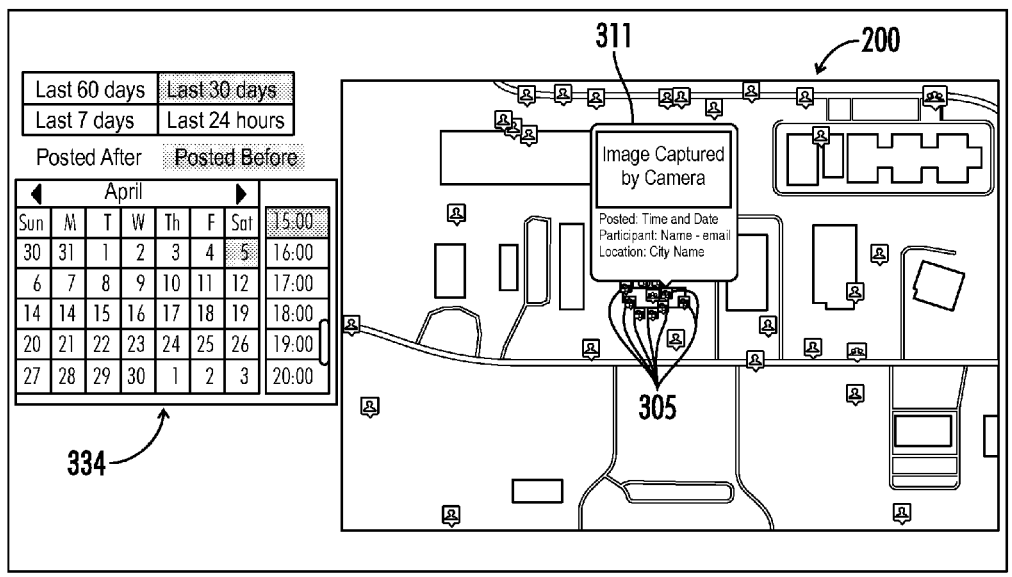
FIG. 9 depicts an exemplary map that may be displayed by a messaging system, such as is depicted by FIG. 1.

FIG. 9 depicts an exemplary map 200 that may be displayed by the client 17 after images have been captured in response to at least one solicitation event. Note that the map 200 shown by FIG. 9 may be the same map shown by FIGS. 5 and 6 or a different map. For each set of image data 54 that is accessed by the WX data manager 100, the WX data manager 100 is configured to display a respective graphical object 305, referred to hereafter as "image icon." The image icons 305 have a different shape or appearance than that of the participant icons so that the type of icon can be readily ascertained by a user upon viewing. For the exemplary icons 305 shown by FIG. 9, each location icon 305 depicts an outline of a camera, unlike the participant icons, which depict outlines of a person. Each image icon 305 represents a location from which at least one of the sets of image data 54 was captured.

In this regard, as described above, each set of image data is associated with location information indicating the location of image capture. For a given set of image data 54 received from the server 12, the WX data manager 100 is configured to use the location information that is associated with the image data 54 in order to display a corresponding image icon 305 at the location on the map 200 corresponding to the geographic location indicated by such location information. Thus, if a user desires to see an image captured at a certain geographic region of interest, the user can select an image icon 305 that is within the area of the map 200 representing such geographic region. In response to such selection, the WX data manager 100 may display the image data 54 associated with the selected icon 305 or otherwise perform an action using such data 54 as may be desired.

In one exemplary embodiment, when the user selects a particular image icon 305 by hovering a mouse over the icon 305 or otherwise providing an input for selecting the icon 305, the WX data manager 311 is configured to display a window 311 (FIG. 9) that includes an image (e.g., thumbnail) of the set of image data 54 associated with the selected icon 305. Thus, a user can readily see the set of image data 54 to determine whether he or she desires to select such image data 54 for further use by the WX data manager 100 or otherwise, such as selecting the image data 54 for rendering in a display generated by the WX data manager 54.

As shown by FIG. 9, the window 311 may include various information associated with the set of image data 54 displayed therein, such as the name or other identifier of the participant who captured the image, the location of capture, and the time of capture, as determined from the metadata that is transmitted to the server 12 along with the image data 54, as described above. In other embodiments, other techniques for enabling a user to select a set of image data 54 of interest are possible.

Note that the system 10 greatly simplifies the process of soliciting images of interest from remote participants. In this regard, the system 100 automatically tracks the current location of the participants, and the user of the client 17 is able to send a solicitation message to each participant currently within a region of interest by simply identifying the region of interest and defining the text of the message that he or she would like sent to the participants. Notably, it is unnecessary for the user to manually correlate the solicitation message with the contact information of the participants who are to receive a solicitation. In response to the solicitation message, one or more sets of image data 54 from the participants within the region of interest are returned to the client 17 so that the user can easily find an image of interest to the user.

In addition, in order to comply with the request received from the server 12, it is unnecessary for the participant to search through the applications on his or her computing device 25 for one that permits the participant to capture images. In this regard, the weather application 77 is automatically called in response to the push notification or other message received from the server 12, and the weather application 77 is used to capture the image to be returned to the server 12. Further, after receiving an input indicating that a captured image is acceptable for the solicitation event, the weather application 77 automatically sends the image data 54 to the server 12 without requiring the participant to manually create a message and then attach the image data 54 to the message. In addition, when defining the message, the weather application 77 automatically inserts the server's address into the message so that it is unnecessary for the participant to find such address. Thus, the burden on the participant to capture and send an image is greatly reduced thereby increasing the likelihood that the participant will agree to respond to the solicitation message from the server 12.

It should also be noted that image data 54 received from the participants may be retained in memory 34 to define a history of images captured over extended time periods. In such case, the system 10 may be configured to permit the user to search for images that were taken from a region of interest during a particular time period of interest.

In this regard, a user is permitted to provide inputs indicating a time period of interest for the purpose of searching for images. For example, in one exemplary embodiment, the WX data manager 100 may be configured to display along with a map 200 a graphical object 334 representing a calendar, as shown by FIG. 9. Using such object 334, the user may select a day and a time of day (such as a particular hour or other time period) of interest. Based on such inputs, the WX data manager 100 is configured to communicate with the server 12 in order to request images that are time-stamped with a time within the indicated time period. In response the messaging logic 30 searches for and returns the stored image data 54 for images matching the request.

For each such image, the WX data manager 100 displays an image icon, which can then be selected by the user, according to the techniques described above. In such case, only images taken within the indicated time period are displayed on the map 200 so that the user can easily find an image of interest that satisfies the search criteria input by the user.

It should be emphasized that the embodiments described herein are exemplary, and various changes and modifications to the described embodiments would be apparent to a person of ordinary skill upon reading this disclosure. As an example, it is unnecessary for the server 12 and client 17 to be implemented at locations that are remote from each other. Indeed, the functionality of the server 12 and the client 17 may be implemented by a single computer system. Various other changes and modifications are possible in other embodiments.

An exemplary operation and use of the system 10 will now be described below with particular reference to FIG. 10.

Assume that a user, while viewing the map 200 shown by FIG. 5, desires to have an image captured of a weather event represented by the weather object 211. As shown by block 333 of FIG. 10, the user selects a region of interest in which the weather event of interest has occurred, is occurring, or will likely occur. As an example, based on the map 200 and possibly other factors, the user may determine a probable region in which the weather event will occur in the near future and then provide inputs via input interface 121 for selecting such region, such as by clicking and dragging a mouse over the area of the map 200 representing the geographic region of interest. FIG. 6 shows the map 200 after the user has selected the geographic region represented by object 236.

After selecting the geographic region of interest, the user provides inputs indicating a desire to initiate a solicitation event for the identified region. In response, the WX data manager 100 displays a GUI, such as a text box, for permitting the user to define a textual message to be sent to participants in the identified image, as shown by block 336 of FIG. 10. In the current example, assume that the user defines a textual message requesting participants to take images of weather or weather-related damage occurring at or near the participant's location. After defining the textual message, the user provides another input for initiating the solicitation event, as shown by block 339 of FIG. 10.

In response, the WX data manager 100 transmits a solicitation command to the server 12 indicating the geographic region of interest. As an example, the solicitation command may include location coordinates indicating the boundary of the geographic region previously selected by the user.

In response to such command, the messaging logic 30 is configured to analyze the location data 53 to determine which participants are currently within the geographic region of interest. In the current example, the participant associated with the participant icon 223 in FIG. 6 should be within such region. For each such participant, the messaging logic 30 transmits a message, such as a push notification, to the user computing device 25 of such participant. In response, the OS 70 of the user computing device 25 is configured to display a banner prompting the participant to provide an input indicating whether he or she desires to view the received message. If the participant provides an input indicating that he or she desires to view the message, then the OS 70 calls the weather application 77, which then displays the message to the user. Alternatively, the OS 70 may automatically call the weather application 77, which displays the message, without requiring the participant to provide any inputs.

Specifically, the weather application 77 displays the textual message defined by the user of the client 17 requesting that the participant capture an image of the weather event that is occurring or about to occur at the participant's location. Such message may include a selectable graphical object that, if selected by the participant, causes the camera driver to 98 to be invoked. Thus, if the participant selects such object, the user computing device 25 automatically transitions to an image capture mode for permitting the participant to capture an image without requiring the user to search among the available applications on his or her computing device 25 for an image capture application.

Upon selection of the foregoing graphical object, a video feed from the camera 97 is rendered in a GUI defined by the weather application 77. Such GUI includes a graphical object that, when selected by the participant, causes the weather application 77 to capture the image being rendered at the time of such selection. Once this occurs, the weather application 77 is configured to display the captured image and to prompt the user to confirm whether the captured image is acceptable. As an example, FIG. 8 shows an exemplary GUI 263 for which the user can indicate that the captured image (which is displayed within the GUI) is acceptable by selecting the phrase "Use This Photo." If the participant provides an input indicating that the captured image is acceptable, then the weather application 77 automatically transmits the image data 54 defining the captured image to the server 12, as shown by block 342 of FIG. 10. Notably, the participant is not required to manually open an application, such as an email or text message application, for communicating messages and then attach the image data 54 to the message. Instead, the weather application 77 is configured to automatically generate a message destined for the server 12 and attach the image data 54 to the message when the participant indicates that the captured image is acceptable, thereby reducing the effort required by the participant to comply with the request received from the server 12. As indicated above, the weather application 77 is configured to associate certain metadata with the image data 54, such as location data indicating the location of the device 25 at the time of image capture, as indicated by the location sensor 99, and a timestamp indicating the time of capture.

Figure 10:
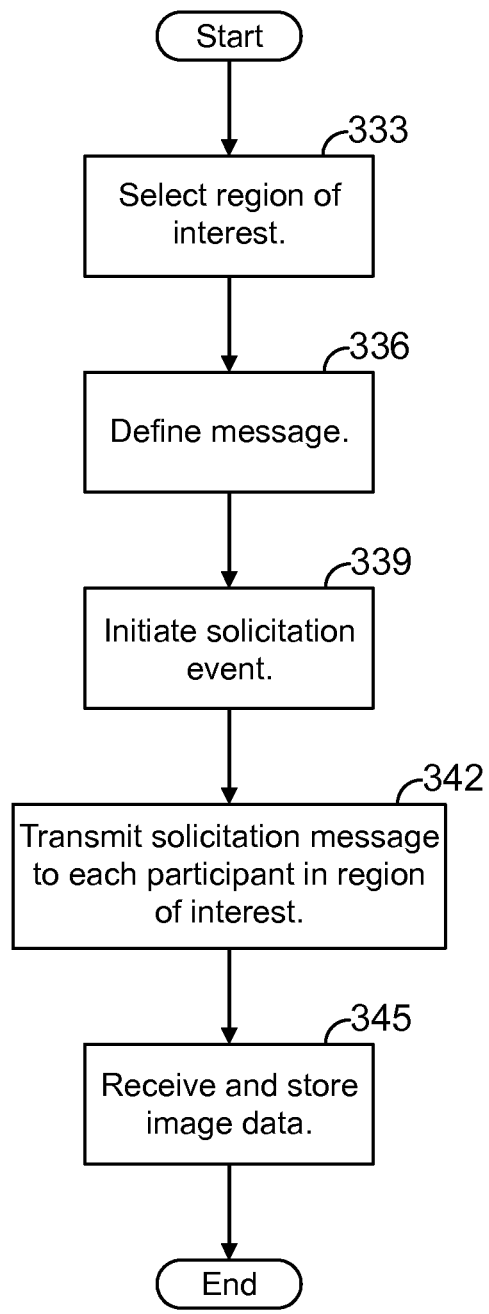
FIG. 10 is a flowchart illustrating an exemplary method for performing a solicitation event.

Upon receiving the foregoing message, the messaging logic 30 is configured to store the image data 54, as shown by block 345 of FIG. 10, and to make the image data 54 accessible to the client 17 that initiated the solicitation event. In one exemplary embodiment, the messaging logic 30 transmits the image data 54 to the client 17, and the WX data manager 100 displays an image icon 305 representative of such image data 54 at the point on the map 200 corresponding to the location of image capture that is associated with such image data 54. Thus, upon seeing the image icon 305, the user of the client 17 is aware that an image has been captured at the geographic location corresponding to the location of the icon 305 on the map 200. The user may then select this icon 305 to view such image. If the user likes the image, the user may then select the image for further use, such as for display within a display generated by the WX data manager 100.

It should be noted that the system 10 may be used to send messages to participants without soliciting images as is described above. As an example, the same process described above for selecting a region of interest and then sending messages to participants within the selected region may also be used to send various types of messages other than solicitation messages. As an example, based on the weather data 55 displayed on the map 200, a user of the client 17 may observe that a particular weather event is about to affect a region, and the user may define a message warning of the weather event to send to participants within the affected region. In another example, the user may send geo-fenced messages unrelated to specific weather events, such as marketing messages or other types of messages that may be of interest to participants. As a mere example, a weather station may be hosting a marketing event or other type of event at a certain location in the near future, and the user of the client 17 may use the system 10 to send messages advertising the event to participants within a certain distance of the event. Alternatively, the user of the client 17 may desire to offer a new service and desire to send a message advertising the new service to participants within a certain region. In such examples, a message may be defined and communicated to the participants within a selected region of interest, and such message may be displayed at the user computing devices 25 of such the participants via the same techniques described above for communicating messages to solicit images from the participants.

In addition, in the embodiments described above, the system 10 is described as soliciting participants to capture images of at least one event occurring within a selected geographic region of interest. However, it should be emphasized that similar techniques may be used to solicit information about such event from the participants. As an example, rather than requesting that a participant provide an image during a solicitation event, a user of the client 17 may define a textual message requesting that the participants within a selected region of interest provide information about weather events or other types of events that may be occurring in the selected region of interest. In response, rather than capturing and returning images, the participants may instead provide inputs defining a message to be returned to the client 17. It is also possible for the user of the client 17 to solicit both images and information.

The techniques described above for enabling a participant to capture an image and have the image sent without manually specifying or selecting a return address may be used to do the same for a message defined by the participant. In this regard, in response to a solicitation originating from the client 17, the weather application 25 may automatically display a graphical user interface for receiving inputs defining a textual message. Using such graphical user interface, the participant may define a textual message, such as an email message or a text message, and the weather application 77 may automatically define an address for such message identifying the server 12 so that the message can be automatically sent to the server 12 without the participant having to manually define or select the address. In other embodiments, other techniques can be used to communicate a message back to the server 12, which sends the message to the client 17.

Now, therefore, the following is claimed:

1. A system, comprising:
    memory for storing location data indicative of locations of a plurality of user computing devices;
    a data manager configured to display a map;
    an input interface for receiving user inputs for selecting a region of the map corresponding to a geographic region affected by or to be affected by a weather event and for defining a textual message to be communicated to users within the geographic region; and
    messaging logic configured to track locations of the user computing devices and to update the location data as the locations of the user computing devices change, the messaging logic configured to determine which of the user computing devices are at locations corresponding to the selected region of the map, the messaging logic further configured to transmit the textual message to at least one of the user computing devices determined to be at a location corresponding to the selected region of the map in response to the user inputs, wherein the textual message is for requesting at least one user to capture at least one image associated with the weather event within the geographic region.

2. The system of claim 1, wherein the data manager is configured to display on the map at least one object indicative of the weather event.

3. The system of claim 1, wherein the plurality of user computing devices include at least a first user computing device and a second user computing device, wherein the messaging logic is configured to receive image data from the first user computing device, wherein the image data is associated with location information indicative of a location of the first user computing device at a time of capture of the image data, and wherein the data manager is configured to display on the map an icon representing the image data based on the location information.

4. The system of claim 1, wherein the at least one computing devices has memory for storing an application that is configured to prompt a user of the at least one user computing device to capture an image associated with the weather event in response to the textual message.

5. The system of claim 1, wherein the data manager is configured to display icons on a map, each of the icons representing at least one image captured by a user in response to the textual message.

6. The system of claim 5, wherein the data manager is configured to render weather data on the map on which the icons are displayed.

7. The system of claim 1, wherein the plurality of user computing devices include at least a first user computing device and a second user computing device, wherein the first user computing devices is configured to store a weather application for providing weather alerts and weather data to a user of the first user computing device, wherein the textual message is of a format for causing the first user computing device to call the weather application, and wherein the weather application is configured to display a graphical user interface on the first user computing device for permitting the user of the first user computing device to view a feed from a camera of the first user computing device, and wherein the weather application is configured to transmit at least one image captured by the camera to the messaging logic.

8. A method, comprising:
    storing, in memory, location data indicative of locations of a plurality of user computing devices;
    displaying a map via an output interface;
    receiving at least one user input for selecting a region of the displayed map corresponding to a geographic region affected by or to be affected by a weather event;
    receiving at least one user input for defining a textual message;
    tracking locations of the user computing devices;
    updating the location data based on the tracking;
    determining which of the user computing devices are at locations corresponding to the selected region of the map based on the location data; and
    transmitting the textual message to at least one of the user computing devices determined to be at a location corresponding to the selected region of the map, wherein the textual message is for requesting at least one user to capture at least one image associated with the weather event within the geographic region.

9. The method of claim 8, further comprising displaying on the map at least one object indicative of the weather event.

10. The method of claim 8, wherein the plurality of user computing devices include at least a first user computing device and a second user computing device, and wherein the method further comprises:
    receiving image data from the first user computing device, wherein the image data is associated with location information indicative of a location of the first user computing device at a time of capture of the image data; and
    displaying on the map an icon representing the image data based on the location information.

11. The method of claim 8, further comprising prompting a user of the at least one user computing device to capture an image in response to the textual message.

12. A method, comprising:
    storing, in memory, location data indicative of locations of a plurality of user computing devices;
    identifying a geographic region affected by or to be affected by a weather event;
    receiving at least one user input for initiating a solicitation event to solicit users to provide images associated with the weather event;
    tracking locations of the user computing devices;
    updating the location data based on the tracking;
    determining which of the user computing devices are within the geographic region based on the location data; and
    transmitting a solicitation message to at least one of the user computing devices determined to be within the geographic region in response to the at least one user input, the solicitation message for soliciting a user of the at least one user computing device to capture at least one image associated with the weather event.

13. The method of claim 12, wherein the at least one user input indicates the geographic region.

14. The method of claim 12, further comprising:
    storing the image in memory; and
    associating the image with the weather event in the memory.

15. The method of claim 12, further comprising displaying a weather map, the weather map indicative of the weather event, wherein the at least one user input selects the geographic region from the weather map.

16. The method of claim 12, further comprising displaying icons on a map, each of the icons representing at least one image captured by a user in response to the solicitation message.

17. The method of claim 16, further comprising rendering weather data on the map.

18. The method of claim 12, further comprising:
    storing a weather application on the at least one user computing device, wherein the solicitation message is of a format for causing the at least one user computing device to call the weather application in response to the solicitation message;
    providing weather alerts and weather data to a user with the weather application;
    displaying with the weather application a graphical user interface on the at least one computing device;
    presenting a feed from a camera of the at least one computing device via the graphical user interface; and transmitting an image captured by the camera from the at least one user computing device via the weather application.

19. The method of claim 18, further comprising:

displaying an icon representing the image on a map; and displaying weather information related to the weather event on the map.

\* \* \* \* \*